United States Patent [19]

Aspinwall

[11] 4,195,473
[45] Apr. 1, 1980

[54] GAS TURBINE ENGINE WITH STEPPED INLET COMPRESSOR

[75] Inventor: Robert H. Aspinwall, Zionsville, Ind.

[73] Assignee: General Motors Corporation, Detroit, Mich.

[21] Appl. No.: 836,355

[22] Filed: Sep. 26, 1977

[51] Int. Cl.² .............................................. F02C 9/14
[52] U.S. Cl. .................................. 60/39.29; 415/143; 415/155
[58] Field of Search ................ 60/39.29, 39.27; 415/182, 183, 155, 143

[56] References Cited

U.S. PATENT DOCUMENTS

| | | |
|---|---|---|
| 2,582,809 | 1/1952 | Weir. |
| 2,662,371 | 12/1953 | Rennie et al. |
| 2,821,067 | 1/1958 | Hill ........................................ 415/182 |
| 3,045,894 | 7/1962 | Ross ..................................... 60/39.27 |
| 3,124,931 | 3/1964 | Mock. |
| 3,133,416 | 5/1964 | Mock ..................................... 60/39.27 |
| 3,829,235 | 8/1974 | Wollenweber ......................... 415/182 |

Primary Examiner—Robert E. Garrett
Attorney, Agent, or Firm—J. C. Evans

[57] ABSTRACT

A gas turbine engine has an inlet compressor with a stepped centrifugal impeller and a double diffuser therefrom controlled by valve means and operative to supply air to combustion apparatus from when motive fluid is directed through a turbine to drive the compressor. The turbine may drive the load or a second power turbine in series with the compressor drive turbine can be included. The discharge from the double diffuser is controlled to vary the mass flow of the engine for operation at idling and under light loads and operable to be completely open for higher power output of the engine.

2 Claims, 5 Drawing Figures

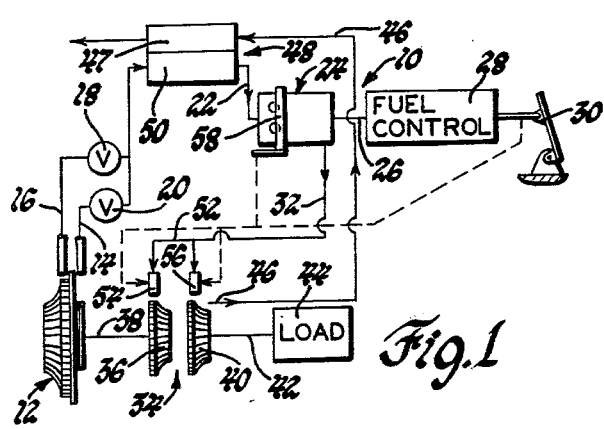
Fig.1
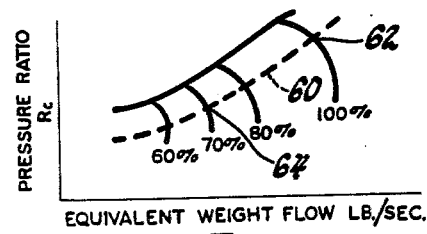
Fig.2
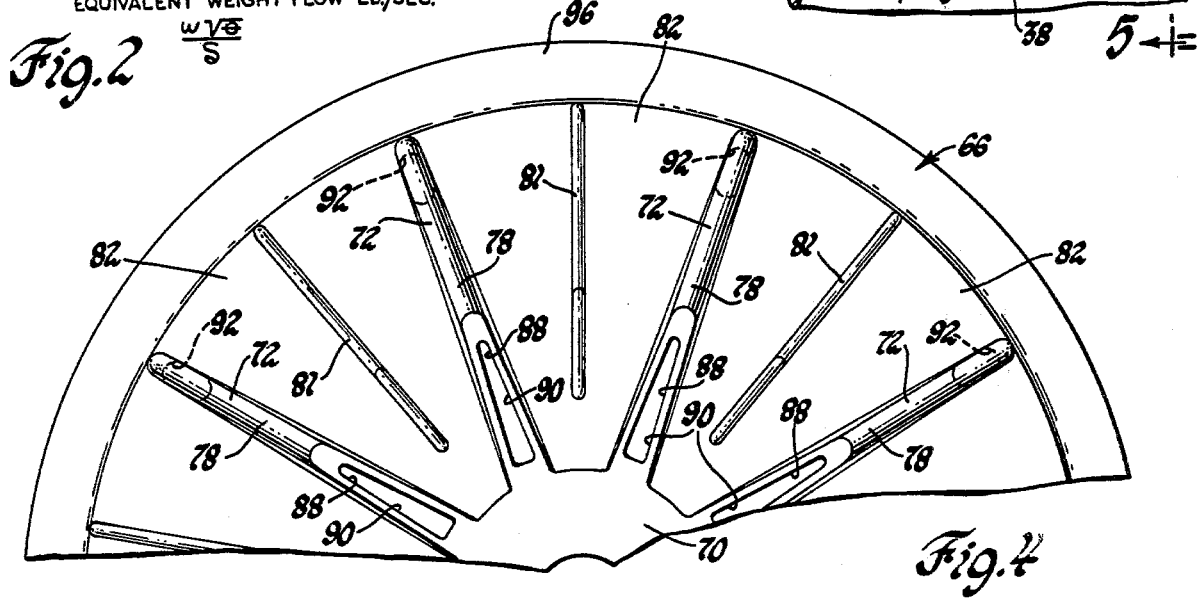
Fig.3
Fig.4
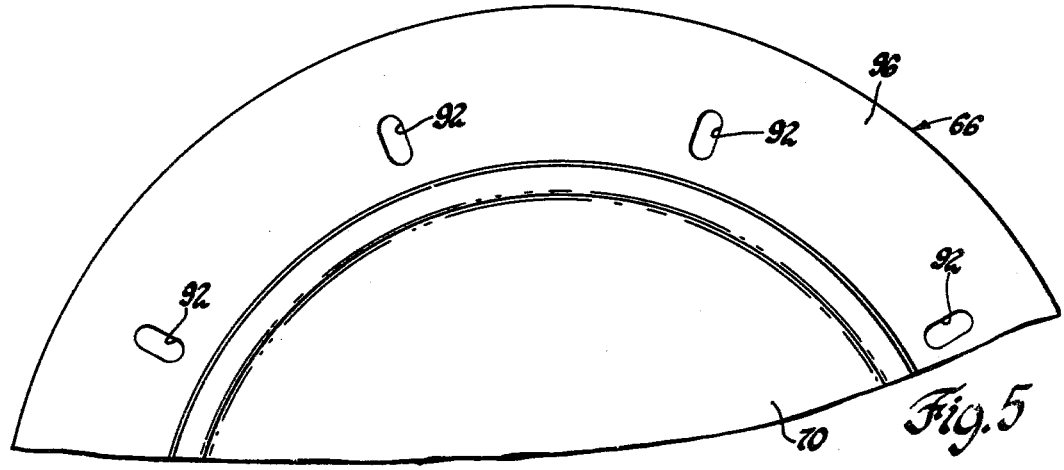
Fig.5

GAS TURBINE ENGINE WITH STEPPED INLET COMPRESSOR

This invention relates to gas turbine engines and more particularly to gas turbine engines for propulsion of automobiles or the like.

In typical urban automobile operation the engine is operated at idle for a substantial part of the time and in typical highway driving, while not at idle, the engine is operated far below full capacity. Accordingly, gas turbine engines having fixed capacity and a predetermined geometry for mass flow of gas therethrough, to be acceptable for automotive use, must have considerable reserve power for acceleration and thus at times are oversized for power consumption requirements under engine idle and much of the other driving cycle.

Various proposals have been made to vary the configuration of gas turbine engines to reduce air flow therethrough for operation under low power conditions to improve engine efficiency. For example, U.S. Pat. No. 2,582,809, issued Jan. 15, 1952, to Weir, discloses a jet engine with two centrifugal compressors arranged back-to-back, each supplying a group of combustion chambers and each group of combustion chambers supplying one of two cascades of blades on the turbine which drives the compressor. A valve arrangement is included to close or substantially close the inlet to one of the compressors. U.S. Pat. No. 2,662,371 issued Dec. 15, 1953, to Rennie et al discloses a turbojet engine with a compressor having an arrangement for varying the flow area through the compressor and with a number of combustors with valves to close off flow through some of the combustors as the compressor flow area is reduced. U.S. Pat. No. 3,124,931 issued Mar. 17, 1964, to Mock discloses a shaft powered gas turbine for automotive use having a variable diffuser at the compressor outlet and a sliding throttle plate or other means for varying the turbine flow area.

A more recent proposal is set forth in U.S. Pat. No. 3,625,003 issued Dec. 7, 1971, to Liddle et al which has a double entry centrifugal compressor and means on one side of the double entry compressor to close its entrance under idling and light load conditions to improve gas turbine engine efficiency.

An object of the present invention is to step or change the size of a gas turbine engine without altering wheel speed or turbine temperature and thereby improve efficiency of conventional automotive gas turbine engines by means of a stepped centrifugal compressor discharging radially to a pair of diffusers both valve controlled and regulated to control mass flow of gas through the gas turbine engine in accordance with power requirements.

Still another object of the present invention is to step or change the size of a gas turbine engine without altering wheel speed or turbine temperature and thereby improve the efficiency of automotive gas turbine engines by the provision therein of an inlet air compressor having an impeller with a plurality of blades thereon operative at design speed of operation to pump a first predetermined amount of primary inlet air into a first diffuser in the gas turbine engine and further including a rotating channel within the centrifugal compressor impeller located through the interior thereof to exhaust rotating channel secondary air flow into a second diffuser in the engine thereby providing a reduced mass flow of inlet air to the gas turbine engine and further including means for limiting the primary inlet air flow into the engine under idle conditions of operation so that the rotating channel secondary air flow constitutes the mass flow of gas through the engine for limiting power output therefrom under idle engine operation.

Still another object of the present invention is to provide an improved automotive gas turbine engine by the provision therein of a stepped compressor for supplying inlet air to a combustor having fuel flow thereto combusted with inlet air to produce motive fluid for turbines and wherein the centrifugal compressor includes a plurality of radial blades thereon configured to produce a primary air flow and further including a rotating channel within the centrifugal impeller operative to produce a secondary air flow and wherein a double diffuser is located radially outwardly of the stepped compressor to receive inlet air therefrom and wherein valve controls direct either high capacity air flow into the gas turbine engine combustor for acceleration and highway driving conditions or direct a reduced air flow into the engine for operation under idle conditions for reduced power output from the engine.

Yet another object of the present invention is to match automotive gas turbine engine mass flow to engine power requirements and to avoid excessive engine air flow under cruise modes of operation while maintaining sufficient engine air flow to meet acceleration requirements and to avoid stall torque conditions and to do so by means of a stepped centrifugal compressor having a first plurality of radial blades thereon operative to produce a primary air flow from the inlet air compressor to a downstream primary air flow diffuser to the engine combustor and by the further provision in the stepped impeller of a rotating, internal channel for discharging a secondary air flow into a secondary downstream diffuser for producing a separate, lower air flow to the combustor and wherein combustor inlet air flow and turbine gas flow are regulated by control means and are suitably variable to maintain controlled gas flow requirements through the engine in response to control of air flow from both or either one of the primary or secondary diffusers into the combustor under idle and cruise modes of automobile operation.

Further objects and advantages of the present invention will be apparent from the following description, reference being had to the accompanying drawings wherein a preferred embodiment of the present invention is clearly shown.

FIG. 1 is a diagrammatic view of a gas turbine engine for automotive use including the present invention;

FIG. 2 is a performance chart of a gas turbine engine improved by the present invention;

FIG. 3 is a fragmentary, longitudinal cross-sectional view of a stepped inlet air compressor used in the engine of FIG. 1;

FIG. 4 is a fragmentary, vertical sectional view taken along the line 4—4 of FIG. 3 looking in the direction of the arrows; and FIG. 5 is a fragmentary vertical sectional view taken along the line 5—5 of FIG. 3.

Referring now to FIG. 1, an automotive type gas turbine engine 10 is illustrated diagrammatically. The engine 10 includes an inlet air compressor or gasifier 12 that discharges into a pair of conduits 14, 16 under the control of shut-off valves 18, 20 respectively. An inlet tube 22 supplies air to a combustor 24. Fuel is directed to the combustor 24 through a supply conduit 26 under regulation by a fuel control 28 of the type set forth in U.S. Pat. No. 3,879,936 issued Apr. 29, 1975, to Stoltman. Fuel control 28 is set by a manual operator shown as a foot operated accelerator pedal 30. Exhaust from the combustor 24 is directed through a conduit 32 to turbine 34 representatively shown as including a gasifier turbine 36 connected by a shaft 38 to drive the inlet air compressor 12. The automotive gas turbine engine 10 further includes, in the representatively shown example, a power turbine 40 connected by a shaft 42 to a load 44 which may, for example, be the transmission, differential and driving wheels of an automotive type vehicle. The exhaust from the power turbine 40 flows through an exhaust line 46 to the second pass 47 of a regenerator 48 having the first pass 50 thereof connected to the inlet tube 22 upstream of the combustor 24.

Also, the engine 10 may be of a single shaft type with a single turbine drive shaft or a controllable coupling of the type set forth in U.S. Pat. No. 3,237,404 issued Mar. 1, 1966, to Flanigan et al.

In the illustrated arrangement, the conduit 32 splits at 52 to supply both the gasifier turbine 36 and the power turbine 40 under the control of inlet guide vanes 54, 56, respectively, of the type set forth more particularly in FIG. 2 in the aforesaid U.S. Pat. No. 3,625,003 to Liddle et al.

Furthermore, the combustor 24 includes an adjustable controller 58 in association therewith to vary the ratio of the primary to secondary air flow into the combustor in accordance with air flow demand as preset by the accelerator pedal 32 to operate the engine 10 under idle conditions, acceleration or cruise modes of operation. Such a controller 58 is better disclosed in U.S. Pat. No. 3,930,368 issued Jan. 6, 1976, to Anderson et al and is in coupled control relationship to pedal 30.

Examples of automotive gas turbine engines of the type set forth in Conklin et al, U.S. Pat. No. 2,972,230, issued Feb. 21, 1961, and Coleman et al, U.S. Pat. No. 3,267,674 issued Aug. 23, 1966, are oversized in order to meet acceleration and stall torque requirements. In cruise modes of operation the engine air flow in such prior engines is too big and consequently the turbine temperature is reduced under idle conditions to reduce power and air flow.

In such engines, when the turbine temperature is reduced and the compressor operating line 60 is as shown in FIG. 2, the maximum design operating point (shown at 62 on the operating line 60 in the graph of FIG. 2) moves to the cruise point as shown by point 64 on operating line 60. The result is lower power with an increased fuel consumption since the compressor and turbine efficiencies have been lowered.

In accordance with certain principles of the present invention, the inlet air compressor 12 is modified to change the size of the engine without altering the spool speeds of the compressor or the turbine temperature of operation. Furthermore, it is accomplished without using complicated variable geometry in the inlet air compressor. More particularly, this is accomplished in the present invention by including a stepped centrifugal impeller 66 within the housing 68 of inlet air compressor 12. The stepped centrifugal impeller 66 more particularly includes a hub 70 connected to the gasifier turbine shaft 38. The hub 70 includes a plurality of radially directed centrifugal vanes 72 thereon having an inlet edge 74 located immediately downstream of an annular inlet 76 in the inlet air compressor 12. Each of the radially directed vanes 72 further includes a radial tip 78 thereon located in close spaced relationship to an annular shroud 80 which cooperates with pairs of the radial vanes 72 to define a plurality of circumferentially located primary centrifugal flow paths 82 through the impeller 66 each having a splitter vane 81 therein approximately midpoint thereof. Each of the paths 82 includes an axial segment in alignment with the annular inlet 76 and a radially directed outlet 84. The outlets 84 are in communication with a primary vaned diffuser 86 that receives primary air flow from the impeller which is under the control of primary control valve 18.

In order to step or change the size of the engine, the impeller further includes a rotating channel 88 incorporated into the interior of each of the compressor vanes 72. Each of the rotating channels 88 includes an inlet 90 that is axially aligned with the annular inlet 76. Furthermore, each of the channels 88 includes an outlet opening 92 that is in communication with a secondary vaned diffuser 94 located radially outwardly of rear plate 96 on the impeller 66. The rear plate is associated with a seal 98 carried on a divider wall 100 formed between the primary and secondary vaned diffusers 86, 94 as best seen in FIG. 3.

The channel 88 is configured to exhaust into the secondary vaned diffuser 94 at a point behind the primary diffuser 86 and is under the control of the secondary control valve 20.

The illustrated stepped centrifugal impeller 68 can be configured to cause the inlet compressor 12 to flow with both primary and secondary inlet mass flows at identical ratios or at different pressure ratios as desired. If different pressure ratios are used, only one, either the primary or secondary flow path may be opened in which case either one of the shut-off valves 18 or 20 are closed by coupled control to pedal 30. If the primary and secondary flow paths have the same pressure ratios, they can be mixed, used separately or one of the primary or secondary flow paths may be shut off by closing either one of the valves 18, 20 downstream thereof. Alternatively, closure may be effected within the vaned diffusers 86 or 94 by variable closure vanes therein if desired as shown in U.S. Pat. No. 3,992,128 issued Nov. 16, 1976, to Lunsford et al.

The following chart is set forth to representatively illustrate potential flow variations within the concept of the present invention.

| | PRIMARY | SECONDARY | PRIMARY and SECONDARY |
|---|---|---|---|
| Air Flow -$W_a$ | 5 | 1 | 6 |
| Pressure Ratio-$R_c$ | 7:1 | 7:1 | 7:1 |

When the primary or secondary shut off valves 18, 20 are closed, the compressor component (either paths 82 or channels 88) upstream of such a shut off valve is unloaded and the flow tends to recirculate. A modest temperature rise can occur but this is not of a magnitude to cause mechanical problems. The temperature will finally stabilize at the unused component of the impeller 66 at a range in the order of 200° F. to 300° F. The air flow of the utilized compressor flow path through the impeller 66 either the primary centrifugal flow paths 82 or the rotating channels 88, or both, will cause the air flow to be significantly lowered. The turbine temperature and speed will nevertheless be maintained high and component efficiencies will therefore be maximized. Specific fuel consumption will be held at design point values and will not suffer usual design degradation. Moreover, the illustrated design eliminates the need for two separate radial centrifugal inlet air compressors of the type set forth in the aforesaid Liddle patent.

While the embodiments of the present invention, as herein disclosed, constitute a preferred form, it is to be understood that other forms might be adopted.

The embodiments of the invention in which an exclusive property or privilege is claimed are defined as follows:

1. In a gas turbine engine having a turbine for powering a load and wherein a combustor supplies motive power to the turbine and wherein fuel is supplied to the combustor through fuel control means including a manual operator to schedule the fuel supply to meet vehicle acceleration and engine stall torque requirements, the improvement comprising: a gasifier including an inlet and an outlet having first and second diffuser passages, valve means for selectively controlling air flow through said first and second diffuser passages into the engine combustor for mixture and combustion with fuel flow thereto, said gasifier further including an impeller having blade means thereon defining a primary high capacity mass flow path therethrough for directing a first large mass of air into said first diffuser passage, said impeller further including means therein defining a secondary, low capacity mass flow path through said impeller for discharge of a reduced mass of air flow into said second diffuser passage, control means including said valve means operative during a cruise mode of vehicle operation to selectively close flow of air through said first and second diffuser to reduce engine power output by reduction of mass flow of air into the engine combustor for mixture and combustion with fuel flow thereto without reducing the speed of rotation of said impeller, said control means and valve means operative during acceleration modes of vehicle operation to selectively open both said first and second diffuser passages to increase mass flow of air into the combustor for mixture and combustion with increased fuel flow thereto as produced during acceleration modes of operation to increase power output to maintain engine efficiency during an acceleration mode of vehicle operation, said secondary, low capacity mass flow path being defined by an open-ended channel formed internally of said blade means, and means forming a passage from said open-ended channel to said second diffuser passage.

2. In an automotive gas turbine engine having a power turbine and a gasifier turbine and wherein a combustor supplies motive power to the turbines for driving a gasifier and a vehicle power train and wherein fuel is supplied to the combustor through fuel control means including a manual operator to schedule the fuel supply to meet vehicle acceleration and engine stall torque requirements, the improvement comprising: a centrifugal inlet air compressor including an inlet and an outlet having first and second diffuser passages, valve means for selectively controlling air flow through said first and second diffuser passages into the engine combustor for mixture and combustion with fuel flow thereto, said gasifier further including a radial flow impeller having blade means thereon defining a primary high capacity mass flow path therethrough for directing a first large mass of air into said first diffuser passage, said radial flow impeller further including means therein defining a secondary, low capacity mass flow path through said impeller for discharge of a reduced mass of air flow into said second diffuser passage, control means including said valve means operative during a cruise mode of vehicle operation to selectively close flow of air through said first and second diffuser passages to reduce engine power output by reduction of mass flow of air into the engine combustor for mixture and combustion with fuel flow thereto without reducing the speed of rotation of said radial flow impeller, said control means and valve means operative during acceleration modes of vehicle operation to selectively open both said first and second diffuser passages to increase mass flow of air into the combustor for mixture and combustion with increased fuel flow thereto as produced during acceleration modes of operation to increase power output to maintain engine efficiency during the acceleration mode of operation, said secondary, low capacity mass flow path being defined by an open-ended channel formed internally of said blade means and including an outlet in the rear impeller plate and means including said last-mentioned outlet forming a passage from said open-ended channel to said second diffuser passage.

* * * * *

UNITED STATES PATENT AND TRADEMARK OFFICE
CERTIFICATE OF CORRECTION

PATENT NO. : 4,195,473
DATED : April 1, 1980
INVENTOR(S) : Robert H. Aspinwall

It is certified that error appears in the above-identified patent and that said Letters Patent are hereby corrected as shown below:

Column 5, claim 1, line 32, after "diffuser" insert -- passages --.

Signed and Sealed this

Eighteenth Day of November 1980

[SEAL]

Attest:

SIDNEY A. DIAMOND

Attesting Officer

Commissioner of Patents and Trademarks